United States Patent [19]

Gille et al.

[11] Patent Number: 4,934,979
[45] Date of Patent: Jun. 19, 1990

[54] BEARING ASSEMBLY FOR HOOKES UNIVERSAL JOINT

[75] Inventors: Wilfried Gille, Dorsten; Dieter Heier, Gelsenkirchen, both of Fed. Rep. of Germany

[73] Assignee: Gelenkwellenbau GmbH, Essen, Fed. Rep. of Germany

[21] Appl. No.: 314,430

[22] Filed: Feb. 22, 1989

[30] Foreign Application Priority Data

Feb. 27, 1988 [DE] Fed. Rep. of Germany ....... 3806258

[51] Int. Cl.$^5$ .............................................. F16D 3/41
[52] U.S. Cl. ..................................... 464/130; 464/132
[58] Field of Search ................ 464/128, 130, 132, 136

[56] References Cited

U.S. PATENT DOCUMENTS

| | | | |
|---|---|---|---|
| 1,670,612 | 5/1928 | Cutting | 464/132 X |
| 1,672,484 | 6/1928 | Cutting | 464/132 |
| 4,077,235 | 3/1978 | Kleinschmidt et al. | 464/130 |

FOREIGN PATENT DOCUMENTS 194128 10/1971 Fed. Rep. of Germany.
305512 5/1955 Switzerland.

Primary Examiner—Daniel P. Stodola
Attorney, Agent, or Firm—Toren, McGeady & Associates

[57] ABSTRACT

A bearing assembly for a Hookes universal joint including a bearing bush (11) with an external surface (16) for reception in a bore (12) in joint yoke (6), and a support ring (18) screw-threadedly engaged on the external surface of the bush at its ends nearest the axis of rotation of the joint yoke, for adjustment of the position of the bush in the yoke. For locking the support ring (18) in its adjusted position a locking member (23) is provided, with surfaces (24, 25) of different radii of curvature and/or offset centers of curvature so that the locking membrer can become jammed between facing cylindrical surfaces (20, 21) of the bearing bush and support ring. A spring (28, 29) is provided to bias the locking member to its jammed position, and a releasing pin (31) to release it to enable adjustment of the support ring.

12 Claims, 3 Drawing Sheets

BEARING ASSEMBLY FOR HOOKES UNIVERSAL JOINT

BACKGROUND TO THE INVENTION

1. Field of the Invention

This invention relates to a bearing assembly for a Hookes universal joint. A Hookes universal joint, as is well known, comprises two joint yokes rotatable about respective axes, connected to one another by a cross-member having journals supported in bores in the yokes by bearing assemblies. The bearing assembly to which the invention relates comprises a bearing bush for supporting (usually by roller members) a cross-member journal, the bush having an external surface to be received in the bore in the associated joint yoke and, at or towards the end of the bearing bush nearest the axis of rotation of the yoke, a support ring screw-threadedly engaged on the external surface of the bush and engagable with a support surface on the yoke, there being locking means for securing the support ring against rotation in at least one direction relative to the bush. Such a bearing assembly will hereafter be referred to as a bearing assembly of the kind specified.

In a Hookes universal joint having bearing assemblies of the kind specified, the screw-threaded adjustment of the position of the support ring relative to the bearing bush provides a corresponding adjustment of the position of the bearing bush relative to the joint yoke in the assembled joint. Such adjustment enables the cross-member of the joint to be centered relative to the yokes of the joint. Any free play of the cross-member in the directions along its journals can be adjusted and eliminated if required. The present invention relates more particularly to the arrangement of the locking means for securing the support ring against rotation on the bearing bush.

2. Description of Prior Art

One form of locking means for the bearing assembly is proposed in DE-PS-2607515, wherein the joint yoke has a bracket associated therewith, and a bolt passes through the bracket to engage a hole in the support ring to prevent rotation of the latter. A further embodiment of locking means is disclosed in DE-PS-2653908, wherein the support ring is engaged by a securing pin extending through the associated arm of the yoke from its inner to its outer face. The securing pin has a threaded shank part. In each of these cases, however, the yoke has been weakened in order to receive the locking means, and adjustment of the support ring is permitted only in a stepwise manner as established by circumferentially spaced recesses in the support ring. The locking means is not capable of locking the support ring in finely adjusted intermediate positions between the predetermined locking positions.

SUMMARY OF THE INVENTION

It is the object of the present invention to provide a bearing assembly of the kind specified wherein the locking means does not suffer the above-described disadvantages, i.e. the yoke is not weakened by the provision of the locking means and the support ring is able to be locked in any position circumferentially of the bearing bush.

According to the invention we provide a bearing assembly of the kind specified, wherein the bearing bush and support ring have respective cylindrical surfaces facing one another to define an annular space therebetween, and there is received in such space a locking member having first and second contact faces engagable respectively with said facing surfaces of the bearing bush and support ring, said contact faces being so configured as to cause the locking member to become jammed between said surfaces when the locking member is in an appropriate attitude therebetween, there being spring means operable on the locking member to cause the latter to assume said attitude wherein it becomes jammed.

Preferably the contact faces of the locking member comprise curved faces whose radii of curvature are different from one another and/or whose centres of curvature are different from one another, so configured that the locking member jams in one direction of relative rotation between the bearing bush and support ring while it permits relative rotation therebetween in the other direction.

The contact faces of the locking member may be cylindrical, with their centres of curvature offset from one another, and their radii of curvature either the same or different from one another.

The locking means of the bearing assembly according to the invention enables the support ring to be locked against rotation relative to the bearing bush in any relative position therebetween, i.e. infinitely variable fine adjustment is possible. The joint yoke is not weakened by the presence of such locking means.

The spring means may comprise a generally U- or V-shaped hairpin spring element, operative between a nose portion of the locking member and the cylindrical surface of either the bearing bush or support ring. The locking member may be able to be inserted between the cylindrical surfaces of the bearing bush and support ring in different orientations in order to determine the direction of relative rotation between the bearing bush and support ring which it is to prevent by becoming jammed therebetween.

To facilitate release of the locking member if required, to enable adjustment between the bearing bush and support ring, the locking member may have a recess able to receive a releasing pin between the locking member and cylindrical surface of either the bearing bush or support ring, to move the locking member from its jammed position against the action of the spring means. Use of a releasing pin is facilitated if the latter is provided with a tapered lead-in surface.

Preferably the locking member is mirror-image symmetrical, to facilitate its manufacture, handling, and installation.

The cylindrical surface of the support ring may be provided at the base of an undercut annular groove therein, so that the locking member is retained between the support ring and bearing bush against accidental displacement therefrom.

In the embodiment described hereafter, both the support ring and bearing bush have their facing cylindrical surfaces extending completely around their circumferences, so that a complete annular space is defined therebetween and a locking member can be accommodated anywhere in such space around the bearing bush. It would be within the scope of the invention however if the cylindrical surface of either the bearing bush or support ring extended only partly therearound, e.g. in a recess or pocket provided in such component. The locking member can then be disposed only in one position relative to such component, but is still able to become jammed against any part of the facing cylindrical surface of the other component, to provide the required fine adjustment of the bearing assembly.

BRIEF DESCRIPTION OF THE DRAWINGS

The invention will now be described by way of example with reference to the accompanying drawings, of which.

DESCRIPTION OF PREFERRED EMBODIMENT OF THE INVENTION

Figure 1:
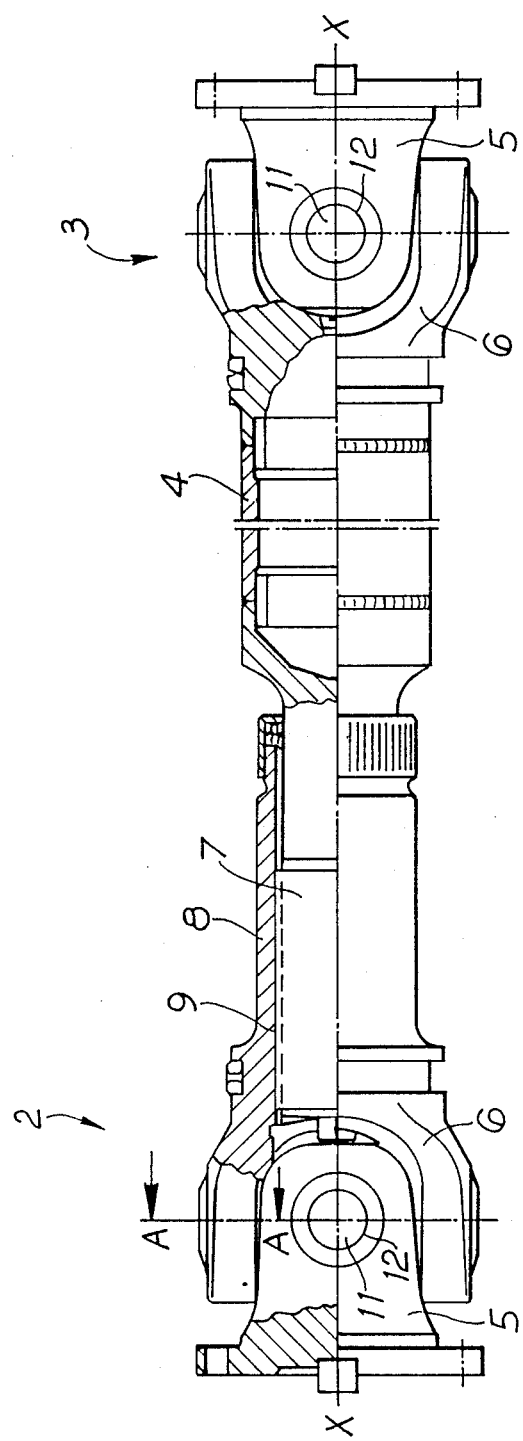
FIG. 1 is an elevation, partly in section, of a drive shaft having Hookes universal joints with bearing assemblies according to the invention.

Referring firstly to FIG. 1 of the drawings, there is shown a drive shaft which comprises two Hookes universal joints 2, 3. Each of the joints comprises two yokes 5, 6 joined by a cross-member, the yokes 5 of the joints being connected to driving flanges for bolted connection to drive elements. The yoke 6 of joint 3 is welded to a tubular intermediate shaft element 4 which in turn is connected to a solid shaft element 7 fitted within a sleeve or muff 8 welded to the yoke 6 of joint 2, the shaft 7 and muff 8 being connected for torque transmission by interengaging splines 9 which permit relative axial movement therebetween and hence an adjustment in the overall length of the drive shaft. Also visible in FIG. 1, for each joint, is one of the bearing bushes 11 forming part of bearing assemblies supporting the journals of the joint cross-members in bores 12 in limbs of the yokes.

To facilitate assembly of the joints, one or other of the yokes of each joint may have detachable limbs or parts thereof.

Figure 2:
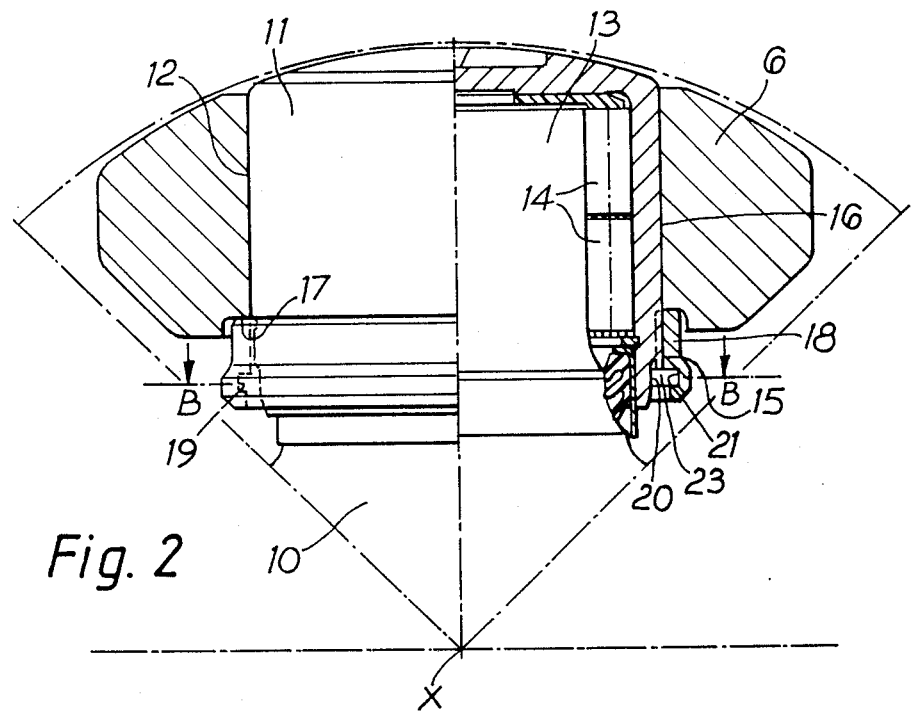
FIG. 2 is a section on the line A—A of FIG. 1, one bearing assembly of the joint.

FIG. 2 shows in greater detail and partly in section one bearing assembly of the joint 2. In FIG. 2 is visible part of the cross-member 10 of the joint and one of the journals 13 extending therefrom into the limb of yoke 6. The limb of yoke 6 has a cylindrical bore 12 therein, in which is received a bearing bush 11 which is cup-shaped, having a cylindrical external surface 16 which is a close fit in bore 12. Roller bearings 14 are interposed between the interior of the bearing bush 11 and the cross-member journal 13, in generally known manner, and a lubricant seal is provided at the open end of the bearing bush 11 engaging the journal 13 at its root, to retain lubricant in the bearing and exclude dirt therefrom.

The external surface 16 of the bearing bush 11 is provided, adjacent the open end of the bearing bush which is nearest the rotational axis of the joint yoke when in use, with a screw thread. An internally screw-threaded support ring 18 is engaged with this screw thread. The support ring 18 engages a support surface 17 of the joint yoke limb, facing radially inwardly towards the rotational axis of the yoke. It will be appreciated that by screw-threaded adjustment of the position of the support ring 18 on the bearing bush 11, the position which the bearing bush is caused to assume in the joint yoke in a direction perpendicular to the axis of rotation of the joint yoke is thus adjustable, for the purpose of centering the joint cross-member relative to the yoke and adjusting the free play thereof.

Figure 3:
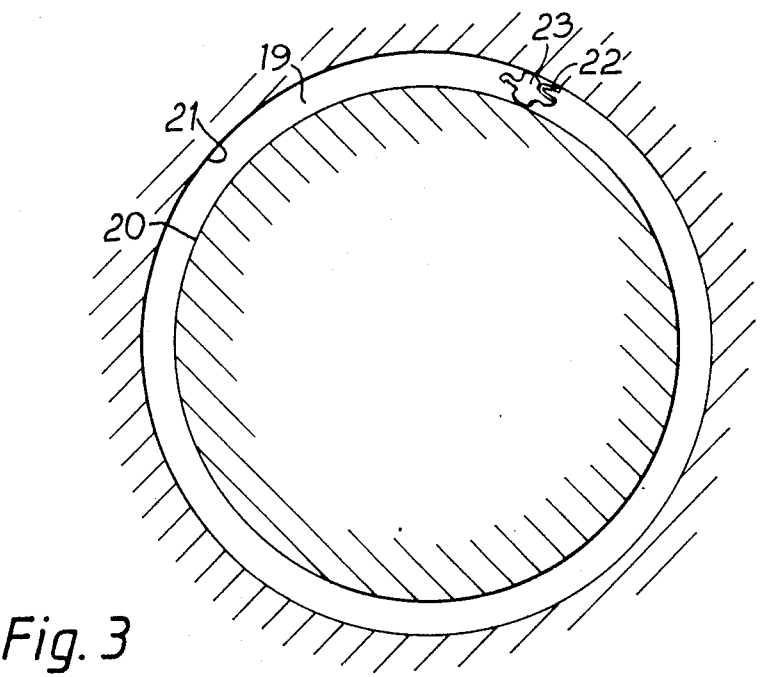
FIG. 3 is a section on the line B—B of FIG. 2, with some detail omitted.

Adjacent the open end of the bearing bush, the support ring 18 is provided with an undercut annular groove 34 whose base is a cylindrical surface 21. The bearing bush has a cylindrical external surface 20 which faces the surface 21, to define an annular space 19 therebetween. In the annular space 19 there is provided a locking member 23, whose purpose is to prevent rotation of the support ring relative to the bearing bush in one direction. Only one locking member 23 is provided in the annular space 19; FIG. 3 shows such a locking member in a first attitude wherein it locks the support ring and bearing bush relative to one another.

Figure 4:
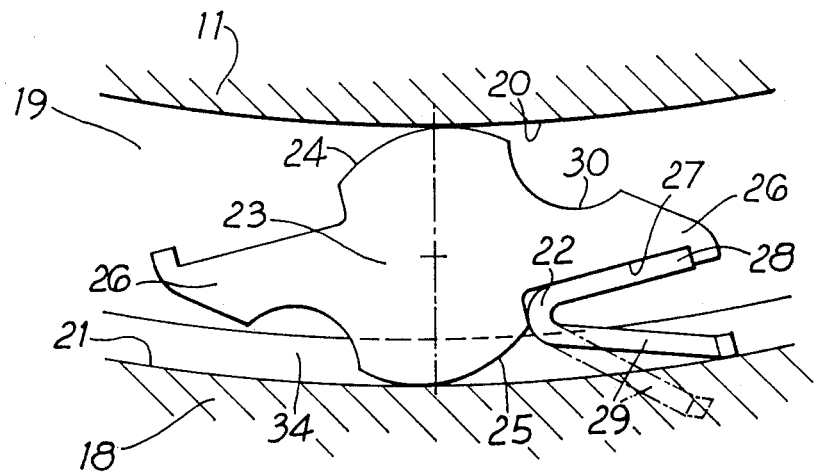
FIGS. 4 and 5 are details of the locking member of the bearing assembly of FIGS. 2 and 3, in different positions.
Figure 5:
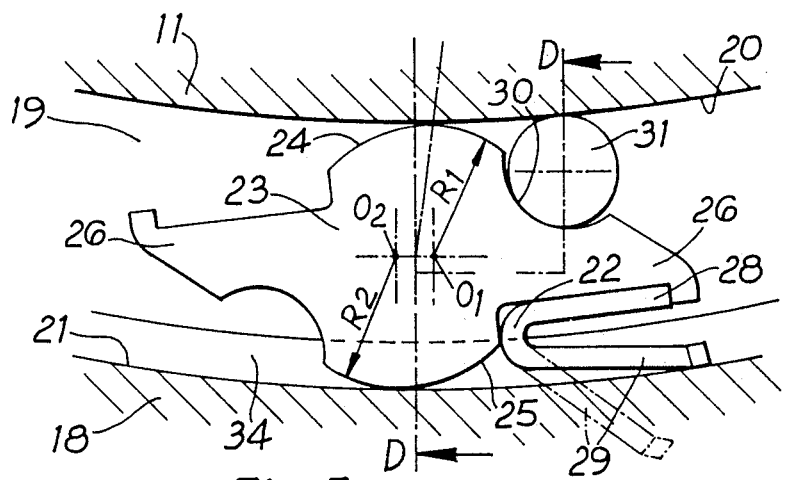

FIG. 4 shows the locking member 23 in the first attitude and FIG. 5 shows it in an attitude wherein the parts are able to undergo relative movement, viewed in the direction lengthwise of the bearing bush and disposed in the annular space 19 between the facing cylindrical surfaces 20, 21 of the bearing bush 11 and support ring 18.

The locking member 23 comprises a body having two oppositely facing contact faces 24, 25. The faces 24, 25 are cylindrical in configuration, whose radii of curvature R1, R2 and/or whose positions of their centres of curvature O1, O2 are different from one another. The different radii of curvature of the surfaces 24, 25 or their different centres of curvature, or the combination of both these expedients, has the effect that when the locking member is moved to an appropriate attitude in the annular space 19 it will become jammed between the surfaces 20, 21 and thus prevent the support ring from rotating in one direction about the bearing bush 11. As the locking member 23 is illustrated in FIGS. 4 and 5, it is angular movement of the locking member in the anti-clockwise sense that causes it to become jammed between the surfaces 20, 21.

To cause such angular movement of the locking member, spring means is provided. This comprises a hairpin spring, i.e. a leaf spring of generally U- or V-shape with limbs 28, 29. The limb 28 of the spring engages in a recess 27 provided in a nose portion 26 of the locking member 23, and the limb 29 of the spring abuts the surface 21. In FIGS. 4 and 5, the limb 29 of the spring is shown in broken lines in the attitude it would assume when not constrained between the recess 27 of the locking member and the surface 21.

Figure 6:
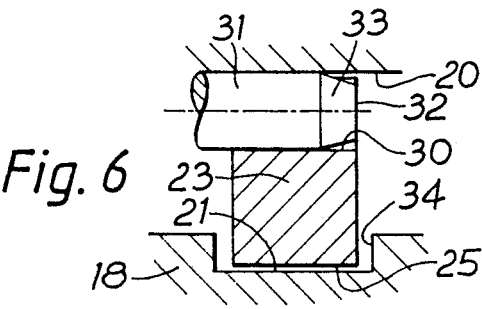
FIG. 6 is a section on the line D—D of FIG. 5.

When it is required, for adjustment purposes, to release the locking member from its jammed condition, it must be moved angularly in the clockwise sense in opposition to the force exerted by spring 28, 29. To facilitate this, the nose portion 26 of the locking member is provided, opposite the recess 27, with a semicylindrical recess 30 which faces the surface 20 of the bearing bush 11. A releasing pin 31 inserted between the recess 30 and surface 20 moves the locking member 23 against the spring 28, 29 to the position shown in FIG. 5, to effect such release. FIG. 6 shows the release pin 31 inserted as above described. It will be noted that the release pin has an end portion 32 with a tapered lead-in surface 33 to facilitate its introduction between the recess 30 of the locking member and the surface 20 of the bearing bush when the locking member is in its jammed position.

The locking member 23 is of mirror image symmetrical configuration. Thus it has a further nose portion 26 opposite that above described, likewise formed with a recess for receiving a spring and a recess for engagement by a releasing pin. Such a mirror image symmetrical configuration of the locking member simplifies production and handling, and enables more varied application thereof. It will be appreciated that if the locking member 23 is placed in a different orientation in the annular space 19 it will be effective to lock the support ring against relative rotation in the other sense about the bearing bush.

FIG. 6 also shows in greater detail the arrangement of the locking member 23 in the undercut annular groove 34 in the support ring 18. The locking member is thus held captive against unintentional displacement in the direction lengthwise of the bearing bush from the space between the support ring and bearing bush. It will also be appreciated that, instead of providing both the bearing bush and support ring with cylindrical facing surfaces extending completely around their circumferences, one of these components could be provided with a part-annular pocket or recess in which the locking member 23 is disposed.

We claim:

1. A bearing assembly for a Hookes universal joint comprising two joint yokes rotatable about respective axes, and a cross-member having journals supported in bores in the yokes by bearing assemblies; the bearing assembly comprising:

a bearing bush for supporting a cross-member journal, the bush having an external surface for reception in a bore of a joint yoke;

said external surface of the bearing bush having a screw-threaded portion adjacent an end of the bearing bush nearest the rotational axis of the yoke;

a support ring screw-threadedly engaged with said screw-threaded portion of said external surface of the bearing bush, said support ring being engagable with a support surface on the yoke;

the bearing bush and support ring having respective cylindrical surfaces facing one another to define an annular space therebetween;

at least one locking member received in said space and having first and second contact faces engagable respectively with said facing surfaces of the bearing bush and support ring, said contact faces being so configured as to cause the locking member to become jammed between said surfaces when the locking member is in an appropriate attitude therebetween; and spring means operable on the locking member to cause the latter to assume said attitude wherein it becomes jammed.

2. A bearing assembly according to claim 1 wherein said contact faces of the locking member comprise curved faces having respective radii and centres of curvature at least one of which is different for one face from that of the other face, so that the locking member jams in one direction of relative rotation between the bearing bush and support ring while permitting relative rotation therebetween in the other direction.

3. A bearing assembly according to claim 2 wherein said contact faces of the locking member are cylindrical and have different centres of curvature.

4. A bearing assembly according to claim 1 wherein the locking member comprises a nose portion affording a recess, and said spring means comprises a generally V-shaped element having a first limb engaging said recess and a second limb engaging one of said cylindrical surfaces of the bearing bush and support ring.

5. A bearing assembly according to claim 1 wherein the locking member comprises a recess for reception of a releasing pin for causing movement of the locking member from its jammed position against the action of the spring means.

6. A bearing assembly according to claim 5 wherein the releasing pin is inserted between said recess of the locking member and said cylindrical surface of one of the bearing bush and support ring.

7. A bearing assembly according to claim 6 wherein said releasing pin has a tapered lead-in surface.

8. A bearing assembly according to claim 1 wherein the locking member is of mirror-image symmetrical configuration.

9. A bearing assembly according to claim 1 wherein the support ring comprises an undercut annular groove having said cylindrical surface at its base.

10. A bearing assembly according to claim 1 wherein said cylindrical surfaces of the bearing bush and support ring extend completely around their circumferences.

11. A Hookes universal joint comprising two joint yokes rotatable about respective axes, and a cross-member having journals supported in bores in the yokes by bearing assemblies, each such bearing assembly comprising:

a bearing bush supporting the journal in its interior and having an external surface supported in the bore of the yoke and provided adjacent the end of the bush nearest the rotational axis of the yoke with a screw-threaded portion;

a support ring screw-threadedly engaged with said screw-threaded portion of the bearing bush, said support ring engaging a support surface of the yoke;

the bearing bush and support ring having respective cylindrical surfaces facing one another to define an annular space therebetween;

a locking member received in said space and having first and second contact faces engagable respectively with said facing surfaces of the bearing bush and support ring, said contact faces being so configured as to cause the locking member to become jammed between said surfaces when the locking member is in an appropriate attitude therebetween; and spring means operable on the locking member to cause the latter to assume said attitude wherein it becomes jammed.

12. A Hookes universal joint according to claim 11 wherein said contact faces of the locking member comprise curved faces having respective radii and centres of curvature at least one of which is different for one face from that of the other face, so that the locking member jams in one direction of relative rotation between the bearing bush and support ring while permitting relative rotation therebetween in the other direction.

* * * * *